United States Patent
Vashist et al.

(10) Patent No.: US 9,135,570 B2
(45) Date of Patent: Sep. 15, 2015

(54) ACTIVE ACQUISITION OF PRIVILEGED INFORMATION

(71) Applicant: TT GOVERNMENT SOLUTIONS, INC., Basking Ridge, NJ (US)

(72) Inventors: Akshay Vashist, Plainsboro, NJ (US); Ritu Chadha, Hillsborough, NJ (US)

(73) Assignee: Vencore Labs, Inc., Basking Ridge, NJ (US)

( * ) Notice: Subject to any disclaimer, the term of this patent is extended or adjusted under 35 U.S.C. 154(b) by 205 days.

(21) Appl. No.: 13/770,353

(22) Filed: Feb. 19, 2013

(65) Prior Publication Data

US 2013/0218817 A1    Aug. 22, 2013

Related U.S. Application Data

(60) Provisional application No. 61/601,689, filed on Feb. 22, 2012.

(51) Int. Cl.
*G06F 15/18* (2006.01)
*G06N 99/00* (2010.01)
*G06N 5/02* (2006.01)

(52) U.S. Cl.
CPC .............. *G06N 99/005* (2013.01); *G06N 5/025* (2013.01)

(58) Field of Classification Search
USPC .......................................................... 706/12
See application file for complete search history.

(56) References Cited

U.S. PATENT DOCUMENTS

| | | | | |
|---|---|---|---|---|
| 7,933,237 | B2 * | 4/2011 | Anjum et al. | 370/328 |
| 7,979,367 | B2 * | 7/2011 | Izmailov et al. | 706/16 |
| 8,023,423 | B2 * | 9/2011 | Chiang et al. | 370/252 |
| 8,315,956 | B2 * | 11/2012 | Vashist et al. | 706/12 |
| 8,589,334 | B2 * | 11/2013 | Vashist | 706/59 |
| 8,665,715 | B2 * | 3/2014 | Ghosh et al. | 370/230 |
| 8,724,508 | B2 * | 5/2014 | Chiang et al. | 370/254 |
| 8,769,677 | B2 * | 7/2014 | Vashist et al. | 726/22 |
| 8,775,364 | B2 * | 7/2014 | Arkoudas et al. | 706/56 |
| 2001/0054032 | A1 | 12/2001 | Goldman et al. | |
| 2003/0101161 | A1 | 5/2003 | Ferguson et al. | |
| 2012/0310864 | A1 * | 12/2012 | Chakraborty et al. | 706/12 |

OTHER PUBLICATIONS

Active learning of hyperspectral data with spatially dependent label acquisition costs Liu, A. ; Goo Jun ; Ghosh, J. Geoscience and Remote Sensing Symposium,2009 IEEE International,IGARSS 2009 vol. 5 DOI: 10.1109/IGARSS.2009.5417684 Publication Year: 2009 , pp. V-256-V-259.*

(Continued)

*Primary Examiner* — Michael B Holmes
(74) *Attorney, Agent, or Firm* — Heslin Rothenberg Farley & Mesiti P.C.

(57) ABSTRACT

A method for active learning using privileged information is disclosed. A processing device receives a set of labeled examples and a set of unlabeled examples. For each unlabeled example in the set of unlabeled examples, the processing device determines whether to query at least one of an oracle to obtain a label for the unlabeled example or a teacher to obtain privileged information about the unlabeled example. The processing device outputs a decision rule based on minimizing a number of queries to the oracle for a label and the teacher for privileged information. Minimizing the number of queries to the teacher and the oracle is based on a cost of querying the teacher or the oracle.

22 Claims, 6 Drawing Sheets

(56) References Cited

OTHER PUBLICATIONS

Entropy-based active learning for object recognition Holub, A. ; Perona, P. ; Burl, M.C. Computer Vision and Pattern Recognition Workshops, 2008. CVPRW '08. IEEE Computer Society Conference on DOI: 10.1109/CVPRW.2008.4563068 Publication Year: 2008, pp. 1-8.*
Semisupervised Hyperspectral Image Segmentation Using Multinomial Logistic Regression With Active Learning Li, J. ; Bioucas-Dias, J.M. ; Plaza, A. Geoscience and Remote Sensing, IEEE Transactions on vol. 48, Issue: 11 DOI: 10.1109/TGRS.2010.2060550 Publication Year: 2010, pp. 4085-4098.*
Learning from summaries of videos: Applying batch mode active learning to face-based biometrics Chakraborty, S. ; Balasubramanian, V. ; Panchanathan, S. Computer Vision and Pattern Recognition Workshops (CVPRW), 2010 IEEE Computer Society Conference on DOI: 10.1109/CVPRW.2010.5544617 Publication Year: 2010, pp. 130-137.*
Applied Communication Sciences, International Search Report, PCT/US2013/026694, mailed Apr. 29, 2013.
Applied Communication Sciences, Written Opinion of the International Search Report, PCT/US2013/026694, mailed Apr. 29, 2013.
Olsson, SICS Technical Report: "A Literature Survey of Active Machine Learning in the Context of Natural Language Processing", Kista, Sweden, T2009:06, ISSN: 1100-3154, Apr. 17, 2009, 55 pages.
Donmez et al., "Proactive Learning: Cost-Sensitive Active Learning With Multiple Imperfect Oracles", CIKM'08, Napa Valley, California, Oct. 26-30, 2008, 10 pages.

* cited by examiner

ACTIVE ACQUISITION OF PRIVILEGED INFORMATION

CROSS-REFERENCE TO RELATED APPLICATIONS

This application claims the benefit of U.S. provisional patent application No. 61/601,689 filed Feb. 22, 2012, the disclosure of which is incorporated herein by reference in its entirety.

FIELD OF THE INVENTION

The present invention relates to knowledge-based methods and systems. More particularly, the present invention relates to a method and system for active learning of decision rules (e.g., classifiers) using privileged information received from a teacher. The privileged information is used only during a learning stage of the decision rule; it is not used during a classification stage or a test stage that follows the training or the decision rule learning stage.

BACKGROUND OF THE INVENTION

There are many occasions in data processing in which decisions need to be made: whether an image contains a face or not, whether an email is spam or not spam, whether a target is enemy aircraft or not an enemy aircraft, etc. Many conventional techniques for classifying data, such as images, have been developed over the years. All such techniques seek to provide what is known as a classifier. A classifier is a decision rule or function that renders decisions given training input examples. As used herein, a decision rule is a function that maps input data or examples (e.g., an example of an image) to a label (e.g., a face).

One of the most heavily employed conventional method for learning classification rules is known as supervised learning. In supervised learning, a classification rules is learned from labeled input examples (say, an image with a face or a not-face label): a classifier is trained on the labeled examples to output a decision rule. Once trained, the classifier/decision rule may be employed to render decisions on new input examples.

Formally, in classical supervised learning, given training examples:

$$L=\{(x_1,y_1),\ldots,(x_l,y_l)\}, x \in X, y \in \{-1,1\}$$

drawn from a fixed but unknown probability distribution P(x, y), i.e., the goal is to find in the given set of functions $f(x, \alpha)$, $\alpha \in \Lambda$ the function $f(x, \alpha_0)$ that minimizes the expectation of error as:

$$f(x,\alpha_0)=\operatorname{argmin}_{\alpha \in \Lambda} R(\alpha)=\int (y-f(x,\alpha))^2 dP(x,y).$$

In this basic setting of supervised learning, the labels y's are known for all the training examples x's and there is no cost associated with obtaining the labels The active learning paradigm is a modification of supervised learning. In active learning, there is a cost associated with labels of the training examples, and the goal is to learn a decision rule that is as accurate as possible while minimizing the cost of labels. In other words, during training, the classifier should use as few labels as possible. This setting is useful when unlabeled examples are available relatively easily but labeling the examples is expensive or requires manual effort. For instance, many unlabeled emails might be available, but a user would like to label only a limited number of emails as spam or not spam. The classifier, during training, should present as few emails as possible to obtain spam or not spam labels from a user.

Formally, in active learning, given training data as a set of labeled examples:

$$L=\{(x_1,y_1),\ldots,(x_l,y_l)\}, x \in X, y \in \{-1,1\}$$

and another set of unlabeled examples:

$$U=\{(x_{l+1}),\ldots,(x_{l+T})\}, x \in X,$$

and access to an oracle which can provide labels for examples in the set U, find a decision rule (that provides better results than the one obtained by using supervised learning on the set L) by making as few queries to the oracle as possible. More particularly, an active learning classification method learns a decision rule from labeled examples and a subset of unlabeled example, for which the algorithm queries the labels from an oracle. A goal of active learning is to efficiently query labels for examples in the set of unlabeled examples. Efficiency may be measured as the number of queries made by the learning algorithm to achieve a particular performance: the number of queries to the oracle needs to be minimized. Further, efficiency may also be measured as the amount of computation required to select examples from the set of unlabeled examples.

In the active supervised learning paradigm, the method selects examples from a set of unlabeled examples and queries labels for the selected examples. More particularly, in active supervised learning, given existing knowledge (a collection of labeled data points or examples), additional unlabeled (i.e., "inexpensive") data points or examples may be employed to further train the decision rule. Queries made to the oracle to obtain a label should minimized in terms of an associated cost (e.g., labels that need to be assigned by a human expert are considered more costly than those that may be assigned by execution of a simple computer algorithm). The labels for samples from the set U should be obtained only for those examples, for which the active supervised learning method is most uncertain.

Measures of uncertainty may include entropy, distance to the decision rule, and uncertainty sampling. In uncertainty sampling, a label is obtained for a sample from the set U for which a classifier is least confident in its prediction. When a classifier renders a prediction, the classifier may also provide a value of the confidence it has in making this prediction, where the confidence is expressed as a probability between 1 and −1. For example, if the confidence value is 1, then an image is confidently classified as a face. If it is −1 then the image is confidently classified as not a face. If the probability is near 0, then the classifier is not confident in its prediction. Labels are thus obtained for those samples in the set U for which the confidence values are near 0.

Another criteria for selecting samples from the set U is to use information based sampling. It is desirable to select labels that are "informative", i.e., labels that optimize expected gain in information about a data point while simultaneously minimizing the probability of error in labeling. For example, suppose the training data for a classifier comprises 100 images of a face and all of them were alike, and suppose the 101st image is very similar to first 100 images. The classifier would assign a high level of confidence that the image is a face to the $101^{st}$ image, so little additional information would be provided by obtaining a label for this $101^{st}$ image. If the $101^{st}$ image is, for example, is a side view and it is very difficult to classify whether it is an image of a face or not a face, then obtaining a label for this image would be much more relevant and informative to the classifier for making a correction to its prediction function. Thus, by meeting the goals of minimizing queries to the oracle for informative labels, a decision rule is obtained by training or learning from fewer labeled data points in less time than supervised learning.

The active supervised learning paradigm described above applies to the classical supervised learning paradigm where one can query only the labels during the training stage. In reality, however, for many problems, much more information in addition to labels is available during the training stage. For instance, while labeling an email as spam or not-spam, a user can mark/highlight parts of the email that can be attributed to spam; this situation is very common. In this setting, the algorithm can query either the label, the additional information, or both during the training stage.

SUMMARY OF THE INVENTION

The above-described problems are addressed and a technical solution is achieved in the art by providing a new method for active learning using privileged information. In the active setting of the learning using privileged information paradigm, the processing device can request the label of the yet unlabeled sample, or privileged information about the unlabeled sample or both the label and privileged information about the unlabeled sample. A processing device receives a set of labeled examples and a set of unlabeled examples. For each unlabeled example in the set of unlabeled examples U, during the training stage the processing device determines whether to query at least one of an oracle to obtain a label for the unlabeled example or a teacher to obtain privileged information about the unlabeled example. The processing device outputs a decision rule while minimizing a number of queries to the teacher for privileged information and the oracle for a label. Minimizing the number of queries to the teacher and the oracle is based on a cost of querying the teacher or the oracle.

In one embodiment, the cost of querying the teacher is greater than the cost of querying the oracle. The cost of querying the teacher or the oracle may be based on computational processing required to process information versus an amount of information gained or the cost may completely depend on the effort estimated in obtaining additional information.

In one embodiment, the processing device may select a plurality of the unlabeled examples for querying. Selecting the plurality of the unlabeled examples for querying further comprises: (a) evaluating a value of the decision rule based on selecting an initial plurality of unlabeled examples; (b) dividing the initial plurality of unlabeled examples into a plurality of clusters; (c) selecting the most uncertain unlabeled example from each cluster; and (d) repeating steps (a)-(c) with a remaining plurality of unlabeled examples until a requested number of unlabeled examples are obtained.

In one embodiment, the selected unlabeled examples are those that provide a most informative measure of gain. The most informative measure of gain may be based on K-L divergence.

In one embodiment, selecting unlabeled examples that provide a most informative measure of gain comprises: making a plurality of queries to the oracle for a corresponding plurality of features; ranking each of the plurality of features based on an ability of a feature to separate a label from privileged information; and selecting one or more of the highest ranking features. In one embodiment, when the cost of a feature when querying the oracle is provided, the processing device may select features based on those features having the highest ranking and the lowest cost.

In one embodiment, selecting the plurality of unlabeled examples may be based on selecting unlabeled examples that provide a most uncertain measure of gain. The most uncertain measure of gain may be based on a transformation of an uncertainty score from the decision rule to a plurality of probabilities.

In one embodiment, determining a decision rule is further based on maintaining a plurality of working hypotheses that form a committee of rules and selecting an unlabeled example where the committee is most inconsistent.

In one embodiment, determining a decision rule may be further based on minimizing generalization error.

In one embodiment, the oracle may available only for training the decision rule.

In one embodiment, the privileged information may incomplete. The incomplete privileged information may be evaluated based on decomposing one or more raw similarity measures into a sum of features and applying normalized spline kernels by normalizing the raw one or more similarity measures by the available privileged information for available unlabeled examples.

In one embodiment, the teacher may comprise a plurality of sub-teachers. In such circumstances, the processing device may cluster labeled examples in the set of labeled examples into a plurality of clusters, rank sub-teachers based on a measure of utility of privileged information for each of the clusters of labeled examples, assign unlabeled examples to the clusters obtained using the set of labeled examples, and prioritize acquisition of privileged information based on a ranking of the sub-teachers based on a cluster providing the closest to an example selected from the set of unlabeled examples.

In one embodiment, wherein the labeled and unlabeled examples may be any form of data including audio, video, or still images.

BRIEF DESCRIPTION OF THE DRAWINGS

The present invention may be more readily understood from the detailed description of an exemplary embodiment presented below considered in conjunction with the attached drawings and in which like reference numerals refer to similar elements and in which.

It is to be understood that the attached drawings are for purposes of illustrating the concepts of the invention and may not be to scale.

DETAILED DESCRIPTION OF THE INVENTION

The present invention relates to a method and system for active supervised learning of decision rules (e.g., classifiers) using privileged information.

Certain embodiments of the present disclosure are based in part on learning using privileged information (LUPI) paradigm. As used herein, privileged information refers to additional information about training examples in addition to a label, such as information from sensors other than those used in describing the samples, high resolution information, expert comments, comparisons, explanations, and metaphors with respect to the data examples and/or associated labels. For example, privileged information may include why an image looks like a face or why it does not look like a face, why does a certain email look like spam, etc. In another example, a high resolution image or video may be available to help classify a low resolution image.

In the LUPI learning model, given a set of training triplets:

$$L' = \{(x_1, x_1^*, y_1), \ldots, (x_l, x_l^*, y_l)\}, x_i \in X, x_i^* \in X^*, y_i \in \{-1, 1\}, i = 1, \ldots, l,$$

(defined by probability measure $P(x, x^*, y)$), the goal is to find, in the given set of functions $f(x, \alpha), \alpha \in \Lambda$, the function $y = f(x, \alpha_0)$ that minimizes the probability of misclassification.

A teacher supplies training examples $(x_i, y_i)$ with the privileged information $x_i^*$. Privileged information may be available only for training examples. It is not available for test examples. Privileged information can speed up the rate of convergence from $$O\left(\sqrt{\frac{h}{l}}\right)$$

up to $$O\left(\frac{h}{l}\right)$$

where h is the Vapnik-Chervonenkis dimension of the set of functions. However, typically the cost of querying a teacher, i.e. obtaining $x^*$ can be different (higher) than the cost of querying the oracle, i.e., obtaining the label y.

In the following description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

Figure 1:
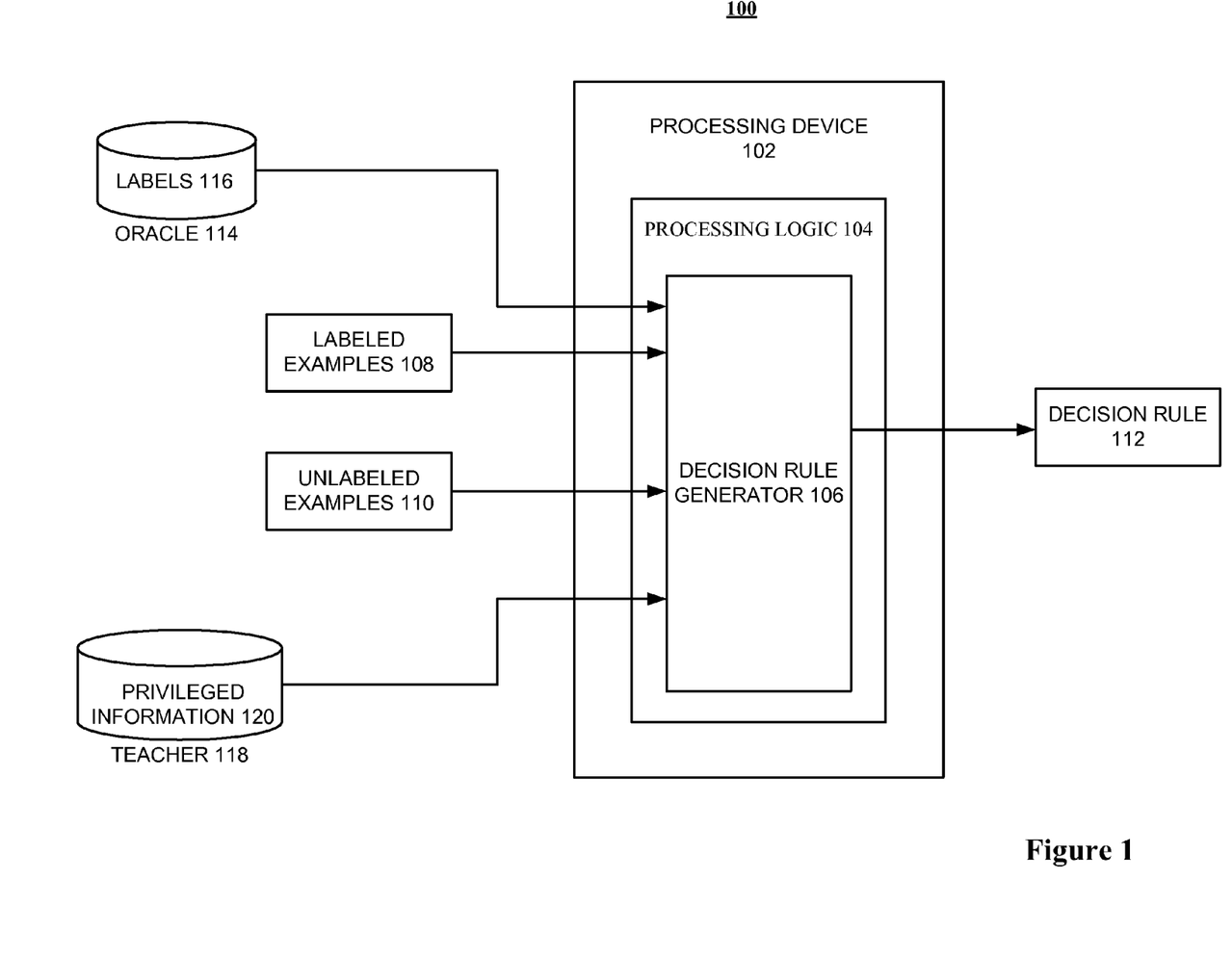
FIG. 1 is a block diagram of a software architecture in which embodiments of the present disclosure may operate.

FIG. 1 is a block diagram of a software architecture 100 in which embodiments of the present disclosure may operate. The software architecture includes processing logic 102 executable by a processing device 104 which implements a decision rule generator 106. The decision rule generator 106 may take in a plurality of training examples including a plurality of labeled examples 108 and a plurality of unlabeled examples 110. The decision rule generator 106 generates and outputs a decision rule 112. In the process of generating a decision rule 112, the decision rule generator 106 may make queries to an oracle 114 (e.g., a database of a database server (not shown)) to obtain labels 116 to be assigned to corresponding unlabeled examples 110. The decision rule generator 106 may make queries to a teacher 118 (e.g., a database of a database server (not shown)) to obtain privileged information 120 concerning either the unlabeled examples 110 or their corresponding labels 116.

Figure 2:
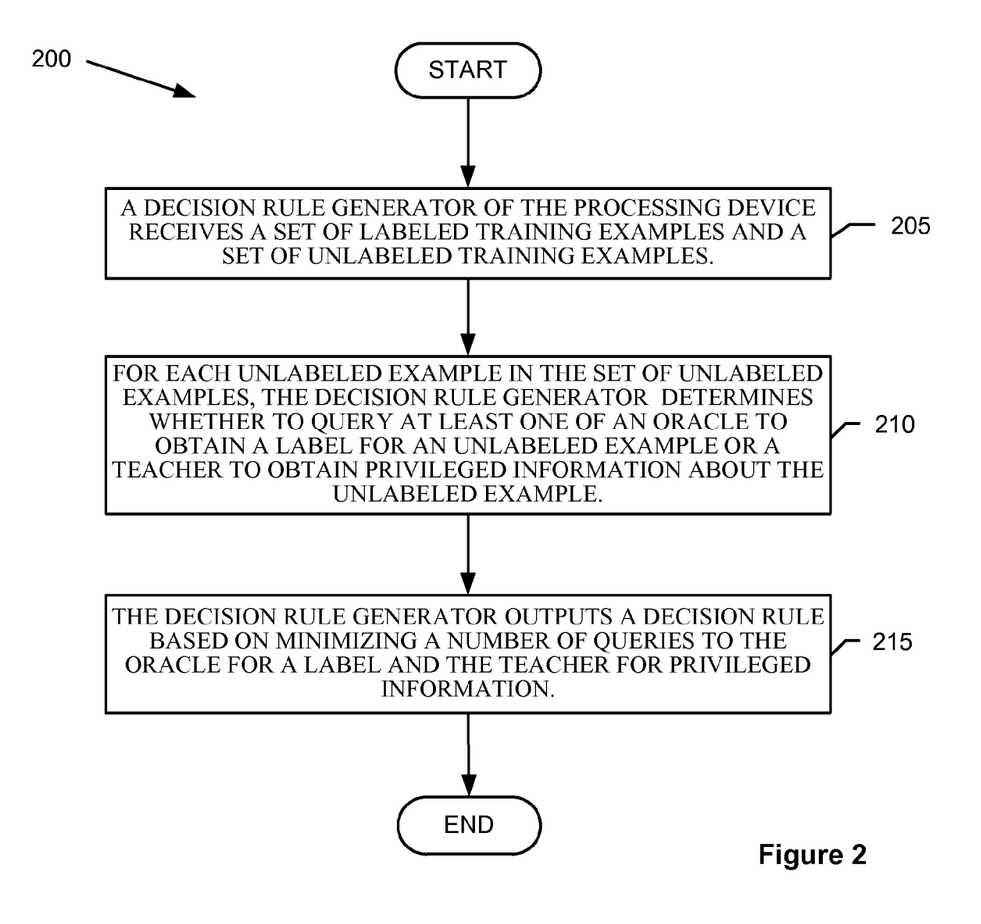
FIG. 2 is a process flow diagram illustrating of one embodiment of a method for active learning using privileged information.

FIG. 2 is a process flow diagram illustrating of one embodiment of a method 200 (hereinafter, the "active learning for LUPI model 100") for active learning using privileged information. Method 200 may be performed by the processing logic 102 (e.g., in computer system 600 of FIG. 6) that may comprise hardware (e.g., circuitry, dedicated logic, programmable logic, microcode, etc.), software (such as instructions run on a processing device), firmware, or a combination thereof. In one embodiment, method 200 is performed by the decision rule generator 104 of FIG. 1.

In one embodiment, method 200 begins when, at block 205, the decision rule generator 106 of the processing device 102 receives a set of labeled training examples 108 and a set of unlabeled training examples 110. At block 210, for each unlabeled example in the set of unlabeled examples 108, the decision rule generator 106 determines whether to query at least one of an oracle 114 to obtain a label 116 for an unlabeled example 110 or a teacher 118 to obtain privileged information 120 about the unlabeled example 110. At block 215, the decision rule generator 106 outputs a decision rule 112 based on minimizing a number of queries to the oracle 114 for a label 116 and the teacher 118 for privileged information 120. Minimizing the number of queries to the teacher 118 and the oracle 114 is based on a cost of querying the teacher 118 or the oracle 114 versus an amount and quality of information gained.

More particularly, in the active learning for LUPI model 100, given a set of labeled training triplets 108:

$$L' = \{(x_1, x_1^*, y_1), \ldots, (x_l, x_l^*, y_l)\}, x_i \in X, x_i^* \in X^*, y_i \in \{-1, 1\}, i = 1, \ldots, l,$$

unlabeled examples 110, $U = \{(x_{l+1}), \ldots, (x_j), \ldots, (x_{l+T})\}$, $x_j \in X, j = l+1, \ldots, l+T$, and access to an oracle 114 which can provide labels 116 for examples 110 in U, and access to a teacher 118 which can provide privileged information 120 for examples 110 in U, determine, using a decision rule generator 106, a decision rule 112 employs the labeled training triplets L', and that requests a minimum number of queries (from U) to the teacher 118 and the oracle 114. For any example selected from U, the decision rule generator 106 can query the oracle 114 to obtain y, the teacher 118 to obtain $x^*$, or both 114, 118 to obtain y and $x^*$. If the teacher 118 provides a vector of features, the cost of different features may vary, and the processing device may query only a subset of features for a selected example.

Querying the teacher 118 for privileged information 120 about the unlabeled examples 110 or the labels 116, as described above, is costlier than an querying the oracle 114, which provides only labels 116 for the unlabeled examples 110 (both as information source and in terms of an amount of computational processing required to process information).

Decisions to be made by the decision rule generator 106 may include, for example, (1) querying a label 116 from the oracle 114 or asking for privileged information 120 from the teacher 118 or both 114, 118 (based on cost of making the query versus gain in quality of information), (2) determining when obtaining privileged information 120 without obtaining a label 116 may be advantageous, (3) determining criteria for requesting privileged information 120 (when to request), and (4) determining how much privileged information 120 to request (i.e., a full set of features or a partial set of features).

For (4), additional decisions to be made include: (i) if partial set of features is selected, determining how to work with partial privileged information (since requesting partial privileged information reduces the information overload on a user/expert and increases computational speed as one needs to solve the difficult part of the problem only on a subset (i.e., the partial privileged information)) and (ii) whether to query one unlabeled example 110 one at a time or in a batch mode (i.e., a subset of unlabeled examples 110 from U). The answers to these decisions are employed by the decision rule generator 106 to updates parameters θ of the model (i.e., the decision rule 112).

In addition to cost versus gain tradeoff in making a query to either the oracle 114, the teacher 118, or both 114, 118 for a given unlabeled example 110, a decision as to which unlabeled example or examples 110 next to query may be based on minimizing one or more risk criteria, or:

$$\min_{query} R(\theta, query)$$

Different definitions of minimizing risk lead to different query selection criteria. In an embodiment, minimizing risk may comprise minimizing the risk or probability of rendering an incorrect decision about an unlabeled example 110. In an embodiment, the decision rule generator 106 may employ one or both of two heuristic methods selecting one or more a plurality of the unlabeled examples 110 for querying: selecting the "most uncertain" unlabeled example 110 given a model and its parameters and/or selecting the "most informative" unlabeled example 110 to optimize expected gain.

These two criteria help determine the cost of querying the teacher 118 or the oracle 114 based on computational processing required to process information (i.e., the reduction in processing requirements due to the selection of most uncertain unlabeled examples 110) versus an amount of information gained (i.e., due to selecting the most informative unlabeled examples 110).

In an embodiment, for querying one unlabeled example 110 at a time, the next unlabeled example 110 to query may be that for which the current classifier (i.e., the decision rule 112) is most uncertain. In an embodiment, uncertainty may be measured by transforming the distance to the decision rule to a probability. In the case of SVM type realizations (SVM+) of LUPI, raw scores, y=f(x) are transformed to probabilities p(y|x). This translates to querying a label 116 from the oracle 114 of a point closest to a decision boundary.

When querying an unlabeled example 110 from a teacher 118 for privileged information 120, x*, the decision rule 112 is employed to estimate the value of a correcting function to updates parameters θ to arrive at an updated decision rule.

In an embodiment, for querying one unlabeled example at a time, the next unlabeled example 110 to query may be that for which the current classifier (i.e., the decision rule 112) is most informative, i.e., a data point that optimizes expected gain. Optimizing expected gain depends on an amount of uncertainty assigned to the privileged information 120. If a query to the teacher 118 to obtain privileged information 120 is more uncertain or has a lower confidence level (which may be empirically assigned by a human expert) in predicting a class of an unlabeled example 110 than that for a query for a label 116 from the oracle 114, then the query for privileged information 120 should be selected, and vice versa.

In one embodiment, this translates to employing an information gain measure, such as K-L divergence.

Other criteria for selecting unlabeled examples 108 may include query by committee and minimizing generalization error. Query by committee naturally applies to ensemble methods (boosting, random forests, etc.). In query by committee, multiple working hypotheses are maintained. One or more examples are selected from where the committee (i.e., the set of hypotheses) is most inconsistent. In the case of an SVM, there is only one hypothesis. In such circumstances, query by committee may still be employed by training the SVM on multiple partitions of data. Different partitions will result in a committee or an ensemble of hypotheses. The consensus of the committee or majority rule may be employed in selecting a hypothesis and its associated selecting unlabeled example 108. In one embodiment, one may include the confidence level of each hypothesis to employ a weighted majority rule instead of a simple majority rule.

Figure 3:
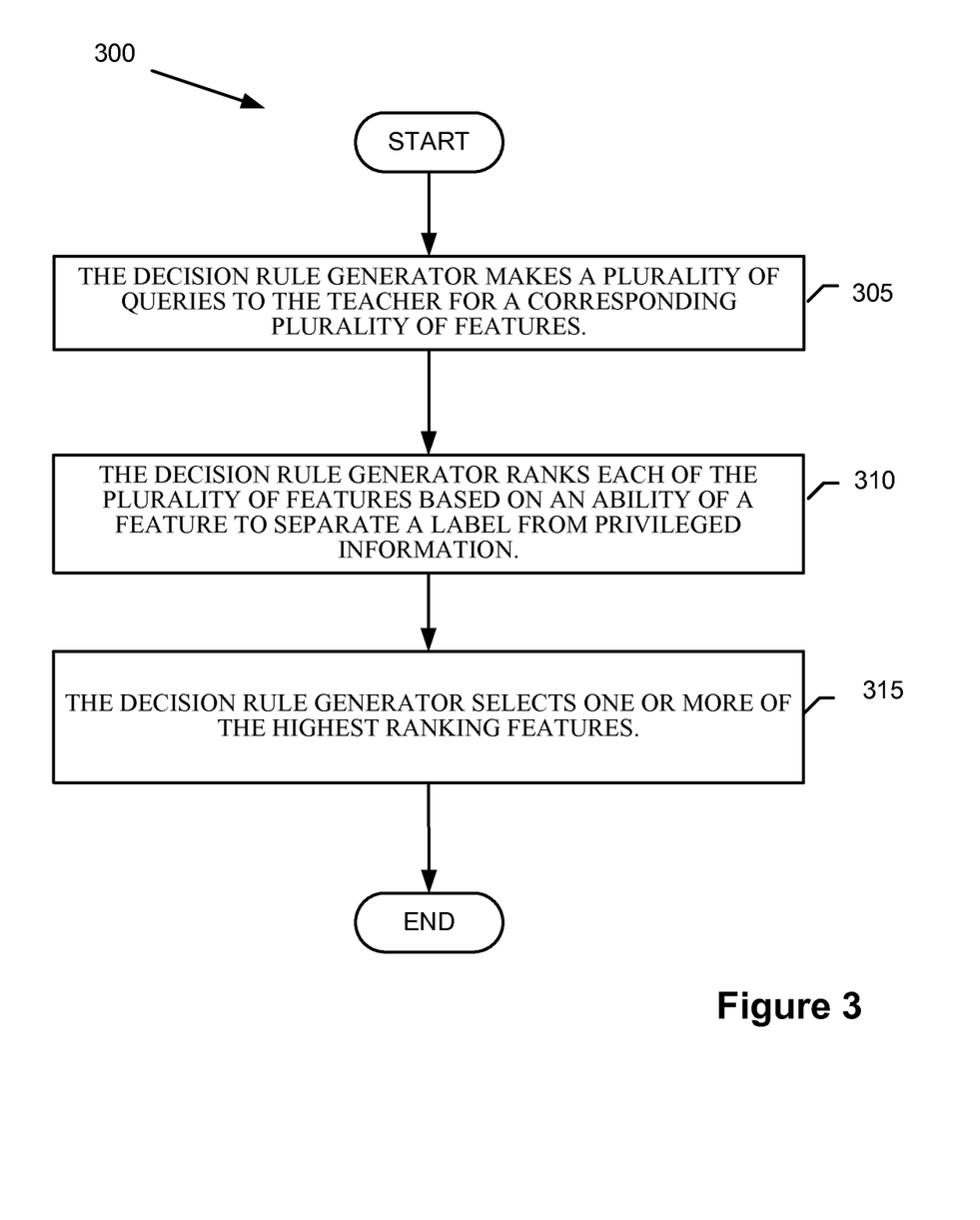
FIG. 3 is a process flow diagram illustrating of one embodiment of a method for acquiring only the most informative features (parts) of privileged information for a selected set of unlabeled examples.

FIG. 3 is a process flow diagram illustrating of one embodiment of a method 300 for acquiring only the most informative features (parts) of privileged information 120 for a selected set of unlabeled example 110. Method 300 may be performed by the processing logic 102 (e.g., in computer system 600 of FIG. 6) that may comprise hardware (e.g., circuitry, dedicated logic, programmable logic, microcode, etc.), software (such as instructions run on a processing device), firmware, or a combination thereof. In one embodiment, method 300 is performed by the decision rule generator 104 of FIG. 1.

In one embodiment, method 300 begins when, at block 305, the decision rule generator 106 makes a plurality of queries to the teacher 118 for a corresponding plurality of features. At block 310, the decision rule generator 106 ranks each of the plurality of features based on an ability of a feature to separate a label 116 from privileged information 120. At block 315, the decision rule generator 106 selects one or more of the highest ranking features, as these features provide maximum discrimination/information.

Alternatively, the cost of different features in the privileged information 120 may be given as the part of the problem, in which case the decision rule generator 106 employs feature ranking in conjunction with cost as the criteria for selection.

Figure 4:
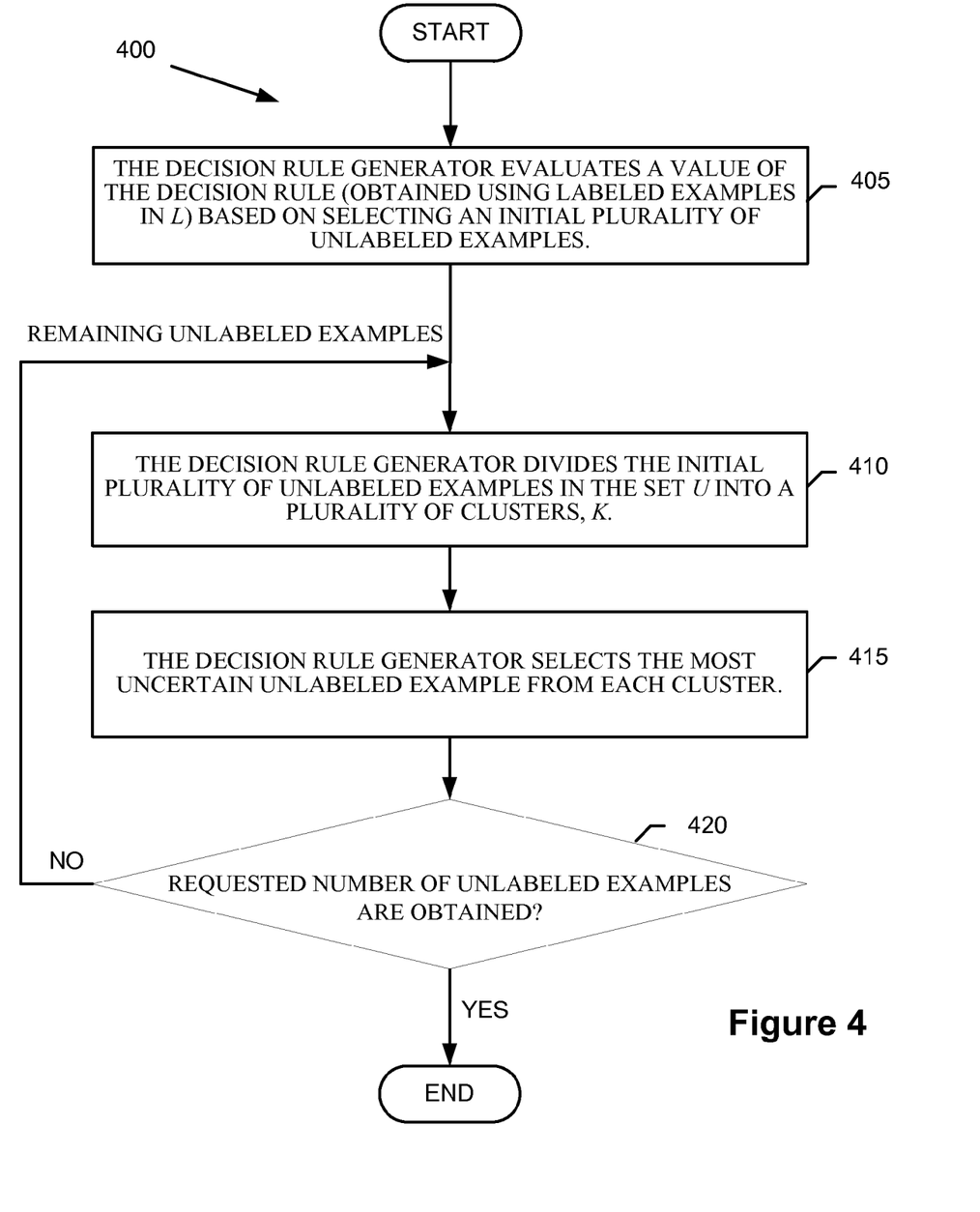
FIG. 4 is a process flow diagram illustrating of one embodiment of a method for acquiring privileged information for a subset of unlabeled examples (batch selection) to obtain an optimal subset selection from the set of unlabeled examples.

In an embodiment, instead of acquiring privileged information 120 for one example at a time, the privileged information 120 may be acquired for a subset of unlabeled examples 110 (batch selection) in U to obtain an optimal subset selection from U. FIG. 4 is a process flow diagram illustrating of one embodiment of a method for acquiring privileged information 120 for a subset of unlabeled examples (batch selection) to obtain an optimal subset selection from the set of unlabeled examples 110. Method 400 may be performed by the processing logic 102 (e.g., in computer system 600 of FIG. 6) that may comprise hardware (e.g., circuitry, dedicated logic, programmable logic, microcode, etc.), software (such as instructions run on a processing device), firmware, or a combination thereof. In one embodiment, method 400 is performed by the decision rule generator 104 of FIG. 1.

In one embodiment, method 400 begins when, at block 405, the decision rule generator 104 evaluates a value of the decision rule 112 (obtained using labeled examples 108 in L) based on selecting an initial plurality of unlabeled examples 110. At block 410, the decision rule generator 104 divides the initial plurality of unlabeled examples 110 in the set U into a plurality of clusters, k. At block 415, the decision rule generator 104 selects the most uncertain unlabeled example 110 from each cluster. At block 420, if a requested number of unlabeled examples 110 are obtained, then processing ceases, otherwise, processing returns to block 410 using the remaining unlabeled examples 110 not selected.

In an embodiment, it may be necessary to work with incomplete privileged information 120 or missing values in the privileged information 120. In such circumstances, the decision rule generator 104 may decompose one or more raw similarity measures into a sum of features. Then, the decision rule generator 104 may apply normalized spline kernels by normalizing the raw one or more similarity measures by the available privileged information 120 for available unlabeled examples 110.

Figure 5:
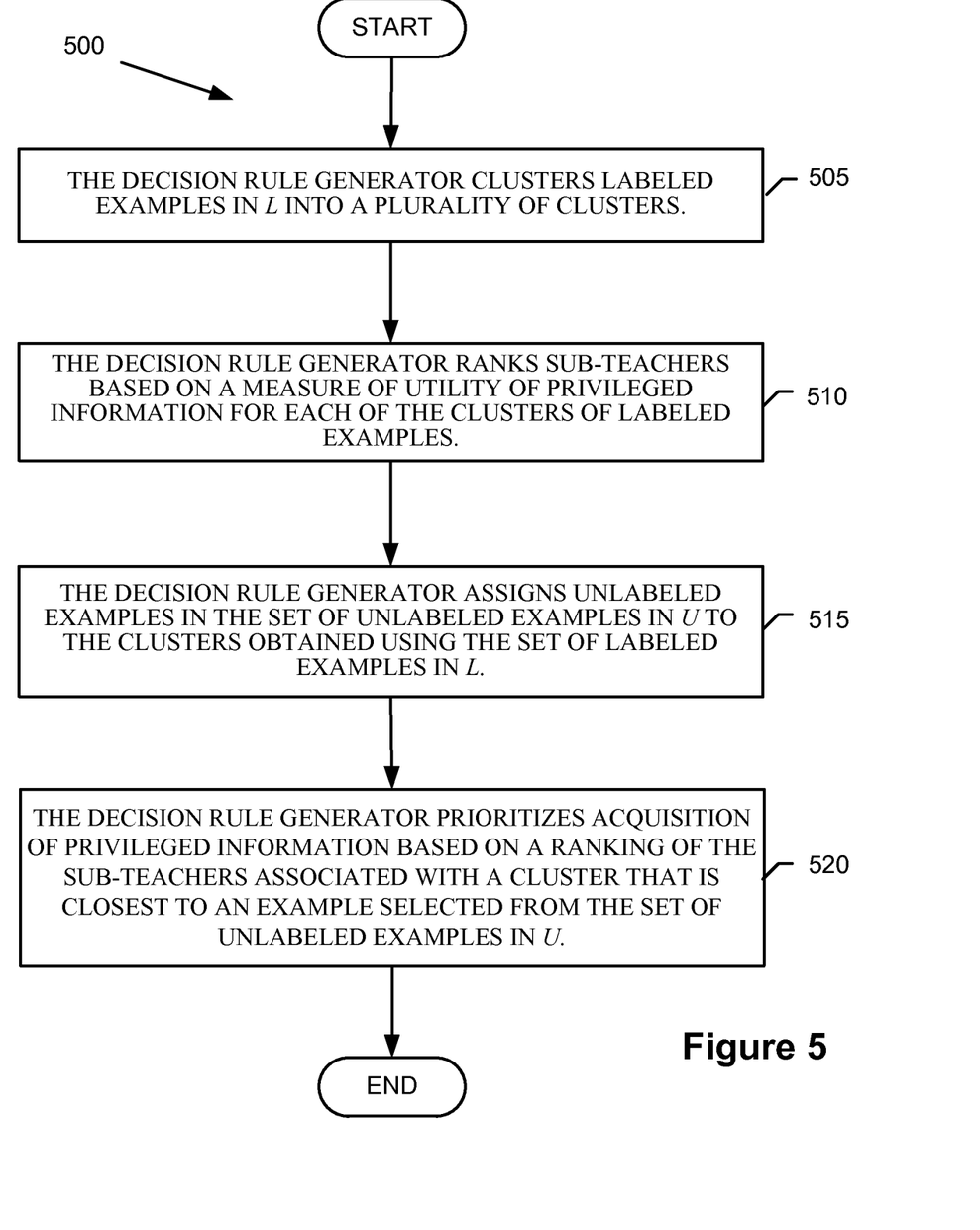
FIG. 5 is a process flow diagram illustrating of one embodiment of a method for acquiring privileged information using multiple teachers.

FIG. 5 is a process flow diagram illustrating of one embodiment of a method 500 for acquiring privileged 120 information using multiple teachers (i.e., a plurality of sub-teachers). Method 500 may be performed by the processing logic 102 (e.g., in computer system 600 of FIG. 6) that may comprise hardware (e.g., circuitry, dedicated logic, programmable logic, microcode, etc.), software (such as instructions run on a processing device), firmware, or a combination thereof. In one embodiment, method 500 is performed by the decision rule generator 104 of FIG. 1.

In one embodiment, method 500 begins when, at block 505, the decision rule generator 104 clusters labeled examples 108 in L into a plurality of clusters. At block 510, the decision rule generator 104 ranks sub-teachers based on a measure of utility of privileged information 120 for each of the clusters of labeled examples 108. At block 515, the decision rule generator 104 assigns unlabeled examples in the set of unlabeled examples 110 in U to the clusters obtained using the set of labeled examples 110 in L. At block 520, the decision rule generator 104 prioritizes acquisition of privileged information 120 based on a ranking of the sub-teachers associated with a cluster that is closest to an example selected from the set of unlabeled examples 110 in U.

Embodiments of the present invention have several advantages over prior art learning paradigms. Active learning in LUPI 100 is a better fit for active learning or other forms of interactive learning because the teacher 118 plays an active role and is more interactive. Active learning in LUPI 100 reduces information overload on a teacher/expert. Learning is faster than in LUPI alone: there are improvements in improved sampling in the space X as well as in the space X*. Computational speed improves as one needs to solve the difficult part of the problem on only a subset of examples. Overall, active learning using privileged information reduces both the computational load as well as the information load by using additional information only for the samples where it is most effective.

Figure 6:
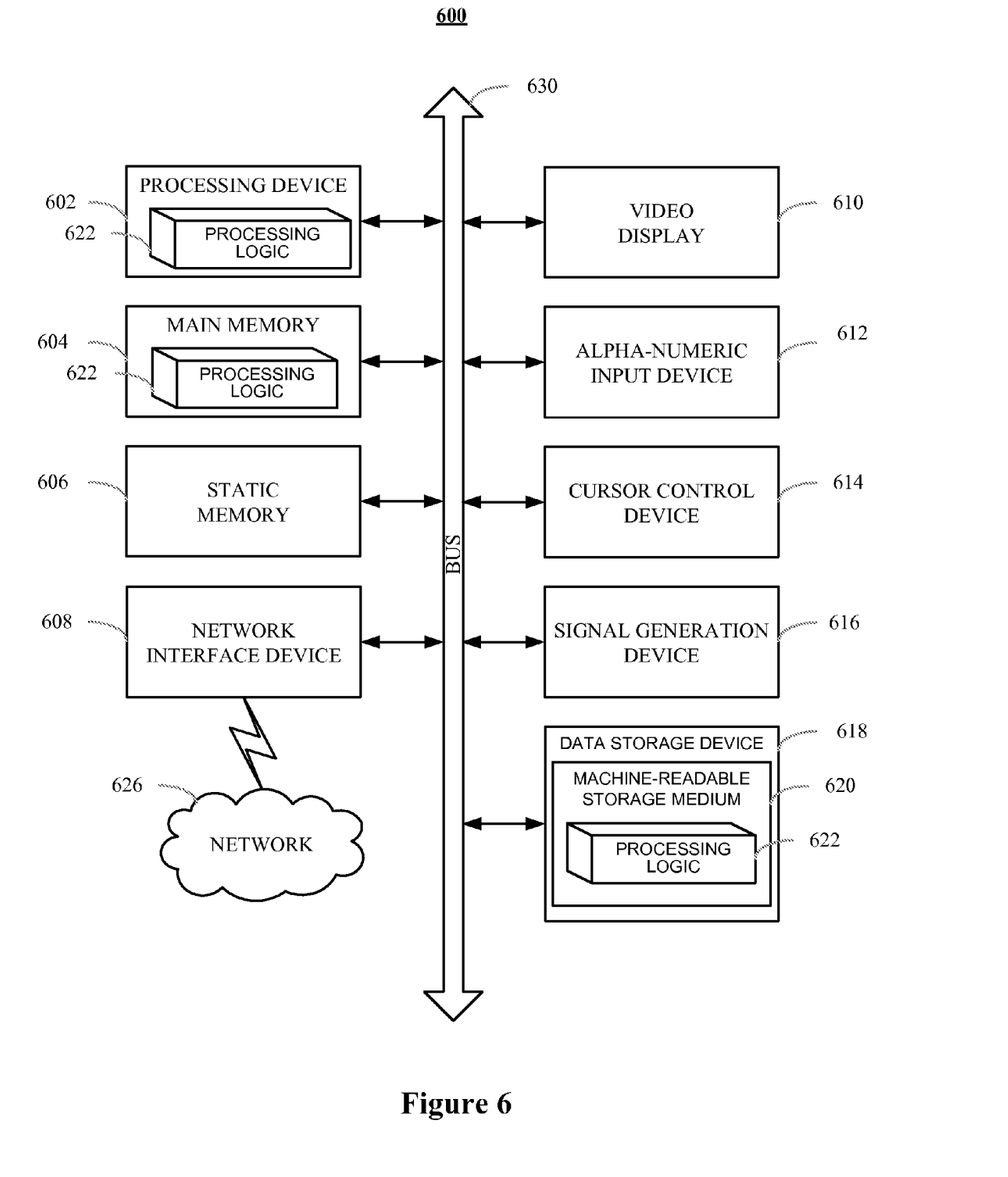
FIG. 6 illustrates a diagrammatic representation of a machine in the example form of a computer system within which a set of instructions, for causing the machine to perform any one or more of the methodologies discussed herein, may be executed.

FIG. 6 illustrates a diagrammatic representation of a machine in the exemplary form of a computer system 600 within which a set of instructions, for causing the machine to perform any one or more of the methodologies discussed herein, may be executed. In alternative embodiments, the machine may be connected (e.g., networked) to other machines in a local area network (LAN), an intranet, an extranet, or the Internet. The machine may operate in the capacity of a server or a client machine in a client-server network environment, or as a peer machine in a peer-to-peer (or distributed) network environment. The machine may be a personal computer (PC), a tablet PC, a set-top box (STB), a personal digital assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 600 includes a processing device 602, a main memory 604 (e.g., read-only memory (ROM), flash memory, dynamic random access memory (DRAM) (such as synchronous DRAM (SDRAM) or Rambus DRAM (RDRAM), etc.), a static memory 606 (e.g., flash memory, static random access memory (SRAM), etc.), and a data storage device 618, which communicate with each other via a bus 630.

Processing device 602 represents one or more general-purpose processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets. Processing device 602 may also be one or more special-purpose processing devices such as an application specific integrated circuit (ASIC), a field programmable gate array (FPGA), a digital signal processor (DSP), network processor, or the like. Processing device 602 is configured to execute processing logic 104 for implementing the decision rule generator 106 for performing the operations and steps discussed herein.

Computer system 600 may further include a network interface device 608. Computer system 600 also may include a video display unit 610 (e.g., a liquid crystal display (LCD) or a cathode ray tube (CRT)), an alphanumeric input device 612 (e.g., a keyboard), a cursor control device 614 (e.g., a mouse), and a signal generation device 616 (e.g., a speaker).

Data storage device 618 may include a machine-readable storage medium (or more specifically a computer-readable storage medium) 620 having one or more sets of instructions (i.e., the processing logic 104) embodying any one or more of the methodologies of functions described herein. The processing logic 104 may also reside, completely or at least partially, within main memory 604 and/or within processing device 602 during execution thereof by computer system 600; main memory 604 and processing device 602 also constituting machine-readable storage media. The processing logic 104 may further be transmitted or received over a network 626 via network interface device 608.

Machine-readable storage medium 620 may also be used to store the device queue manager logic persistently. While machine-readable storage medium 620 is shown in an exemplary embodiment to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instruction for execution by the machine and that causes the machine to perform any one or more of the methodologies of the present invention. The term "machine-readable storage medium" shall accordingly be taken to include, but not be limited to, solid-state memories, and optical and magnetic media.

The components and other features described herein can be implemented as discrete hardware components or integrated in the functionality of hardware components such as ASICs, FPGAs, DSPs or similar devices. In addition, these components can be implemented as firmware or functional circuitry within hardware devices. Further, these components can be implemented in any combination of hardware devices and software components.

Some portions of the detailed descriptions are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the above discussion, it is appreciated that throughout the description, discussions utilizing terms such as "enabling", "transmitting", "requesting", "identifying", "querying", "retrieving", "forwarding", "determining", "passing", "processing", "disabling", or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the present invention also relate to an apparatus for performing the operations herein. This apparatus may be specially constructed for the required purposes or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs and magnetic-optical disks, read-only memories (ROMs), random access memories (RAMs), EPROMs, EEPROMs, magnetic or optical cards, flash memory devices including universal serial bus (USB) storage devices (e.g., USB key devices) or any type of media suitable for storing electronic instructions, each of which may be coupled to a computer system bus.

The algorithms and displays presented herein are not inherently related to any particular computer or other apparatus. Various general purpose systems may be used with programs in accordance with the teachings herein or it may prove convenient to construct more specialized apparatus to perform the required method steps. The required structure for a variety of these systems will be apparent from the description above. In addition, the present invention is not described with reference to any particular programming language. It will be appreciated that a variety of programming languages may be used to implement the teachings of the invention as described herein.

It is to be understood that the above description is intended to be illustrative, and not restrictive. Many other embodiments will be apparent to those of skill in the art upon reading and understanding the above description. Although the present invention has been described with reference to specific exemplary embodiments, it will be recognized that the invention is not limited to the embodiments described, but can be practiced with modification and alteration within the spirit and scope of the appended claims. Accordingly, the specification and drawings are to be regarded in an illustrative sense rather than a restrictive sense. The scope of the invention should, therefore, be determined with reference to the appended claims, along with the full scope of equivalents to which such claims are entitled.

What is claimed is:

1. A method for active learning using privileged information, the method comprising:
   receiving, by a processing device, a set of labeled examples and a set of unlabeled examples;
   for each unlabeled example in the set of unlabeled examples, determining, using the processing device, whether to query at least one of an oracle to obtain a label for the unlabeled example or a teacher to obtain privileged information about the unlabeled example; and
   outputting, using the processing device, a decision rule based on minimizing a number of queries to the oracle for a label and the teacher for privileged information, wherein minimizing the number of queries to the teacher and the oracle is based on a cost of querying the teacher or the oracle.

2. The method of claim 1, wherein the cost of querying the teacher is greater than the cost of querying the oracle.

3. The method of claim 1, wherein the cost of querying the teacher or the oracle is based on computational processing required to process information versus an amount of information gained.

4. The method of claim 1, wherein determining the decision rule further comprises minimizing risk in rendering an incorrect decision about an unlabeled example.

5. The method of claim 1, further comprising selecting a plurality of the unlabeled examples for querying.

6. The method of claim 5, wherein selecting the plurality of the unlabeled examples for querying further comprises:
   evaluating a value of the decision rule based on selecting an initial plurality of unlabeled examples;
   dividing the initial plurality of unlabeled examples into a plurality of clusters;
   selecting the most uncertain unlabeled example from each cluster; and
   repeating the evaluating, the dividing, and the selecting with a remaining plurality of unlabeled examples until a requested number of unlabeled examples are obtained.

7. The method of claim 3, wherein the selected unlabeled examples are those that provide a most informative measure of gain.

8. The method of claim 7, wherein the most informative measure of gain is based on K-L divergence.

9. The method of claim 7, wherein selecting unlabeled examples that provide a most informative measure of gain comprises:
   making a plurality of queries to the oracle for a corresponding plurality of features;
   ranking each of the plurality of features based on an ability of a feature to separate a label from privileged information; and
   selecting one or more of the highest ranking features.

10. The method of claim 9, wherein a cost of a feature when querying the oracle is provided and further comprising selecting features based on those features having the highest ranking and the lowest cost.

11. The method of claim 3, wherein selecting the plurality of unlabeled examples is based on selecting unlabeled examples that provide a most uncertain measure of gain.

12. The method of claim 11, wherein the most uncertain measure of gain is based on a transformation of an uncertainty score from the decision rule to a plurality of probabilities.

13. The method of claim 1, wherein determining a decision rule is further based on: maintaining a plurality of working hypotheses that form a committee and selecting an unlabeled example where the committee is most inconsistent.

14. The method of claim 1, wherein determining a decision rule is further based on minimizing generalization error.

15. The method of claim 1, wherein the oracle is available for training the decision rule.

16. The method of claim 1, wherein the privileged information is incomplete.

17. The method of claim 16, wherein the incomplete privileged information is evaluated based on:
- decomposing one or more raw similarity measures into a sum of features; and
- applying normalized spline kernels by normalizing the raw one or more similarity measures by the available privileged information for available unlabeled examples.

18. The method of claim 1, wherein the teacher comprises a plurality of sub-teachers, the method further comprising:
- clustering labeled examples in the set of labeled examples into a plurality of clusters;
- ranking sub-teachers based on a measure of utility of privileged information for each of the clusters of labeled examples;
- assigning unlabeled examples to the clusters obtained using the set of labeled examples; and
- prioritizing acquisition of privileged information based on a ranking of the sub-teachers based on a cluster providing the closest to an example selected from the set of unlabeled examples.

19. The method of claim 1, wherein the labeled and unlabeled examples are images.

20. A non-transitory computer readable storage medium including instructions that, when executed by a processing device, cause the processing device to perform operations comprising:
- receiving, by a processing device, a set of labeled examples and a set of unlabeled examples;
- for each unlabeled example in the set of unlabeled examples, determining, using the processing device, whether to query at least one of an oracle to obtain a label for the unlabeled example or a teacher to obtain privileged information about the unlabeled example; and
- outputting, using the processing device, a decision rule based on minimizing a number of queries to the oracle for a label and the teacher for privileged information, wherein minimizing the number of queries to the teacher and the oracle is based on a cost of querying the teacher or the oracle.

21. A computer system, comprising:
- a memory;
- a processing device, coupled to the memory to:
  - receive a set of labeled examples and a set of unlabeled examples;
  - for each unlabeled example in the set of unlabeled examples, determine whether to query at least one of an oracle to obtain a label for the unlabeled example or a teacher to obtain privileged information about the unlabeled example; and
  - outputting a decision rule based on minimizing a number of queries to the oracle for a label and the teacher for privileged information, wherein minimizing the number of queries to the teacher and the oracle is based on a cost of querying the teacher or the oracle.

22. The computer system of claim 21, wherein the cost of querying the teacher is greater than the cost of querying the oracle.

* * * * *